United States Patent [19]
McCormick

[11] Patent Number: 5,471,888
[45] Date of Patent: Dec. 5, 1995

[54] MOTION INITIATOR

[75] Inventor: Larry L. McCormick, Camarillo, Calif.

[73] Assignee: G & H Technology, Inc., Camarillo, Calif.

[21] Appl. No.: 226,704

[22] Filed: Apr. 12, 1994

[51] Int. Cl.$^6$ .................................................. G05G 17/00
[52] U.S. Cl. .......................... 74/2; 137/76; 337/1; 403/2; 403/28
[58] Field of Search ........................ 74/2; 137/76; 337/1, 337/4; 403/2, 28

[56] References Cited

U.S. PATENT DOCUMENTS 3,163,732  12/1964  Abbott et al. ............................ 74/2 X
3,359,804  12/1967  Phillips ................................. 337/4 X
3,695,116  10/1972  Baur .................................... 74/2
3,924,688  12/1975  Cooper et al. .......................... 74/2 X

*Primary Examiner*—Allan D. Herrmann
*Attorney, Agent, or Firm*—George J. Netter

[57] ABSTRACT

An electrical initiator (10) includes spool halves (12,14) releasably held together by a coiled retaining wire (42). A link wire (42) also holds a spool (46) fixed to spool half (12) against connector body 16 and the other spool half (16). A cavity on the interior of the two spools physically retain a tensilely loaded shaft (18). An electric current passing through the link wire (42) causes it to become brittle and break releasing the spool halves and contained shaft (18).

7 Claims, 2 Drawing Sheets

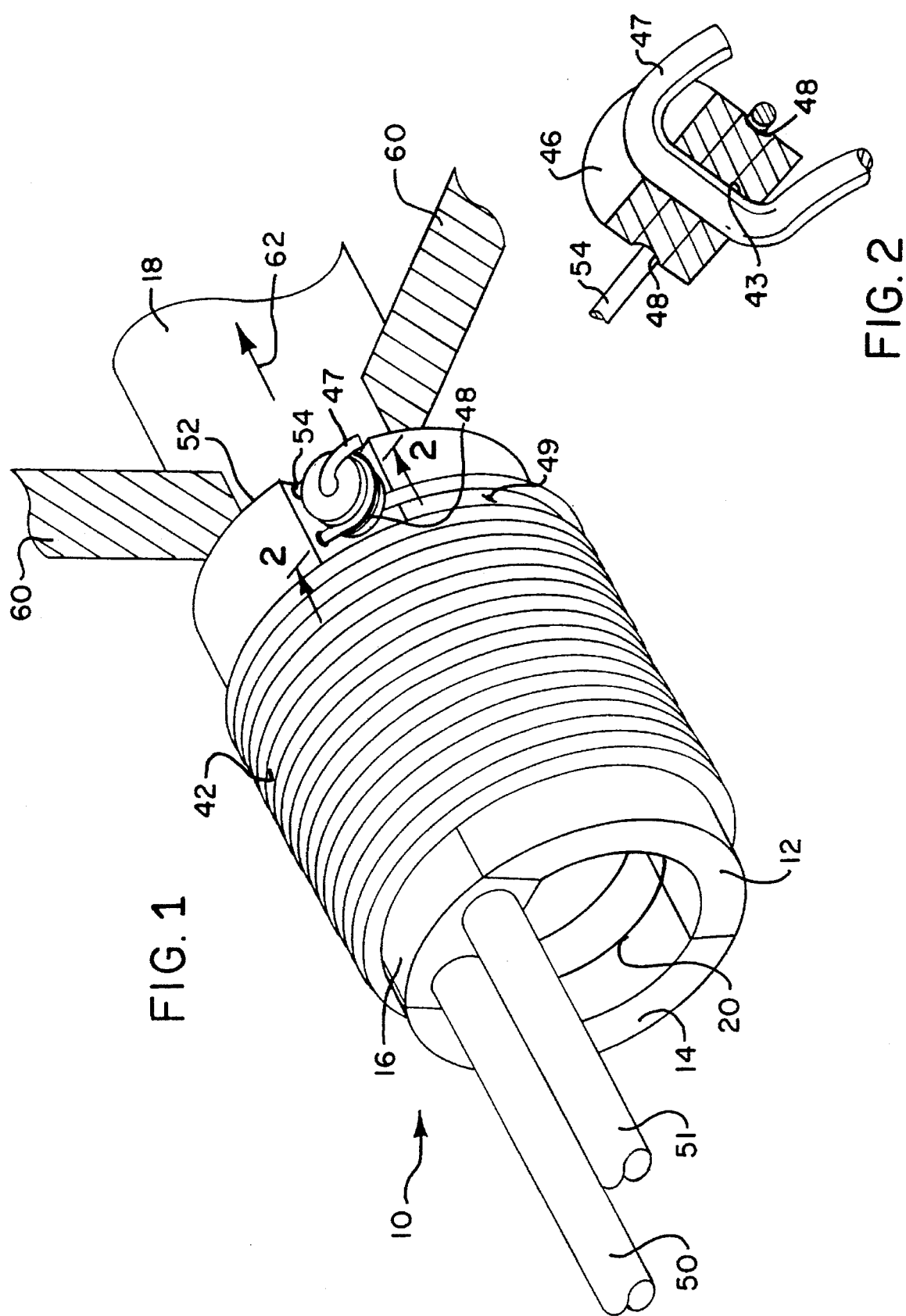

MOTION INITIATOR

BACKGROUND OF THE INVENTION

1. Field of the Invention

The present invention relates generally to a shaft or other object motion initiator, and, more particularly, to such an initiator that is reliable and does not rely upon explosive means for operation.

2. Description of Related Art

There are many situations (e.g., fire fighting systems) in which it is necessary to provide motion of an object or a shaft with precisely timed initiation of the motion and in a reliable manner. In the past, one approach has been to spring-load a member to be moved while at the same time restraining it and explosive means were ignited to sever or rupture the restraining means effecting movement of the member by the spring action. The use of explosive means, however, is prohibitive under many circumstances.

Another approach is that taken in U.S. Pat. No. 3,163,732, Electrically Fused Spring Package, assigned to the same assignee as the present application, in which a coil spring continuously urges bodies 11 and 12 away from one another. An electrically fusible wire 19 extends between the bodies 11 and 12 preventing them from being separated by the spring. Application of a sufficient amount of electric current through the wire causes it to fuse allowing the spring to separate the two bodies from one another.

Still another approach is disclosed in U.S. Pat. No. 3,924,688, Fire Fighting System, assigned to the same assignee as the present application, in which two members 11 and 12 are held together by a wire 17 which is wrapped helically around the members and terminates in a hook-like end. A so-called hot wire 13 has a loop which engages the hooked end of the wire 17 holding the helically wound wire in place about the members 11 and 12, and in that way, securing the members together. When the wire 13 is heated by an electric current to a sufficient condition that it loses its tensile strength, it breaks. This allows the wire 17 to partially unwind from the members 11 and 12 permitting them to be separated by a spring-loaded plunger.

Although the latter patented device has been found to work satisfactorily for many applications, problems have been encountered during use. For example, where the current-carrying wire directly contacts the mechanically securing wire, over time and as a result of vibration, for example, a short circuit can result producing undesirable results. Also, on occasion, the heat produced in the wire by the electric current, as a result of the contact with the mechanically restraining wire as well as other parts of the apparatus, is conducted away from the hot wire to the extent that the hot wire does not lose its tensile strength and thus the apparatus does not operate to release the parts 11 and 12.

SUMMARY OF THE INVENTION

In accordance with the practice of the present invention there is provided initiator apparatus including a pair of substantially semicylindrical spool halves of appropriate dimensions permitting fitting together in a releasable manner. A ceramic electrical body is fittingly received between the two spool halves. A retaining wire is helically wound around the spool halves and ceramic body securing the pieces into a unitary relationship, one end portion of the retaining wire being hooked for receipt within an opening in a first of the spool halves and the other end portion of the wire passing upwardly through the center of a hollow cylindrical ceramic isolator spool with the outer end bent over so as to be secured to the isolator. With the parts fitted together, the retaining wire secures the unitary relationship. However, when an end of the retaining wire is released, the wire will automatically tend to assume a larger diameter by virtue of inherent spring reaction which enables the spool halves and ceramic body to be readily separated.

First and second terminals on the ceramic body are interconnected with a link wire which passes through the ceramic body and extends outwardly in a loop that is received about the ceramic isolator spool within a circular groove on the outer surface.

The internal parts of the spool halves are formed so as to receive an enlarged end portion of a shaft in gripping relationship and prevent axial movement of the shaft from without the spool halves when the apparatus is secured by the helically wound retaining wire as just described. Also, the shaft is subjected to a tensile load tending to remove it from the initiator.

When it is desired to release the shaft, an electric current of sufficient value is passed through the link wire which causes the tensile strength of the link wire to be reduced to the point such that the tensile load will cause the link wire to break, releasing the spool halves and included shaft which then moves in the direction urged by the tensile load.

BRIEF DESCRIPTION OF THE DRAWING

FIGS. 1 is a perspective view of the initiator of the present invention shown in armed mode;

FIG. 2 is a sectional view taken along the line 2—2 of FIG. 1; and

DESCRIPTION OF A PREFERRED EMBODIMENT

Figure 3:
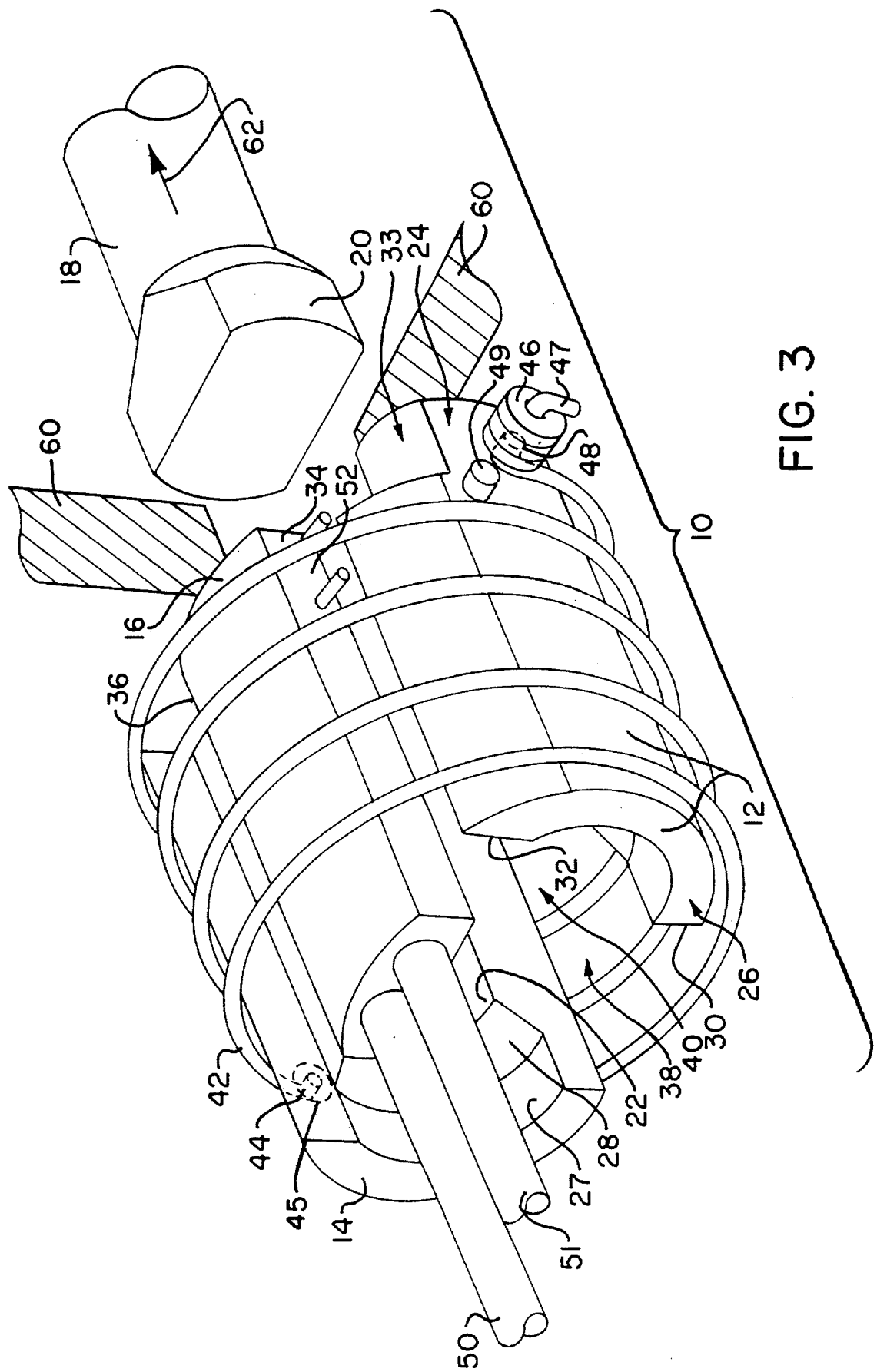
FIG. 3 is a perspective view of the invention similar to FIG. 1 showing the shaft in released or extended relation.

Turning now to the drawings, the shaft motion initiator of the present invention enumerated as 10 is seen to include first and second spool means or halves 12 and 14 and an electrical connector body 16. As will be more particularly shown, the spool halves and connector body fit together about a shaft 18 to entrap the enlarged shaft end 20 within an internal cavity.

The two spool halves are of identical construction (except for several minor differences that will be pointed out and except for each being a mirror image of the other) and, therefore, only the first spool half 12 will be described in detail. With reference also to FIG. 2, the spool half is seen to be an elongated segment of a cylinder (approximately 150 degrees) with a first internal curved wall surface portion 22 of predetermined radius that extends from the shaft entry end 24 of the spool half to a point short of the opposite end 26. The surface portion 22 opens up to a larger radiused mouth 27 at the end 26 with the mouth 27 and surface 22 being separated by a tapered wall 28. One edge face 30 is formed into a smooth flat surface for fittingly mating with the corresponding edge face of the second spool half 14. A second elongated edge face 32 is provided with a smooth surface for a purpose to be described later. A part of the end 24 of spool 12 including a portion of the edge face 32 is removed at 33 leaving a corresponding part of the electrical connector body edge face accessible.

The electrical connector body 16 is substantially the same length as the spool halves and has first and second smooth edge surfaces 34 and 36. The body is approximately a 60 degree segment of a cylinder of the same size as that of the spool halves. Accordingly, the two spool halves 12, 14 and connector body 16 can be fitted together with their various edge surfaces contacting one another (FIG. 1). When so arranged the interior includes an enlarged cavity 38 communicating with a single bore collectively formed from the two curved surfaces 22 that extends to the exterior of the spool halves. The shaft 18 enlarged end 20 is so dimensioned as to enable fitting receipt within the cavity 38 with the remainder of the shaft freely passing along the bore 40.

A helically wound retaining wire 42 having spring temper is received about spools 12,14 and body 16. A first end portion is bent into a hook 44 that is fixedly positioned in an opening 45 in the outer surface of the spool 14. The opposite end of the retaining wire 42 passes through the central bore 43 of a ceramic isolator spool 46 and has its end bent into a hook 47 to prevent removal from the isolator spool. The outer surface of the isolator spool has a circumferential groove 48 formed therein. At a point spaced from the isolator in a direction away from the end 24, there is provided a post 49 integral with the first spool half and extending outwardly therefrom to hold the last turn of the retaining wire 42 spaced from the next to the last turn. This spaced relation prevents the isolator spool with included end of wire 42 from accidentally becoming entangled with the adjacent wire turn and possibly preventing the wire coil from releasing the spool halves.

The connector body 16 includes first and second electrical leads 50 and 51 embedded therein which exit the body adjacent an end 52 from an edge wall portion and are interconnected externally of the body by a metal loop 54 of predetermined extension away from the body.

In assembly, the shaft 18 is located within the two spool halves and connector body with the shaft enlarged end 20 resting within the cavity 38. The helically wound retaining wire 42 is received about the spool halves and connector body (FIG. 1), and the hook 44 secured within the opening in the outer surface of the second spool half 14. The other end of wire 42 passes upwardly through the central bore of the isolator spool 46 and has its end portion bent into the hook 47 as already described. The loop 54 is positioned about the isolator spool 46 within the groove 48. The relative dimensions are such that with the loop so arranged the retaining wire 42 holds the two spools and connector body in a unitary relation with the shaft enlarged head 20 securely trapped therewithin. The entire device described to this point is then mounted to a suitable wall means 60 which can be of any desirable shape and construction and for that reason is only depicted in schematic form. A tensile load (e.g., spring) 62 further represented by the arrow in FIG. 1 is applied to the shaft and maintained throughout the armed phase shown in this figure.

When it is desired to actuate the initiator 10, an electric current is passed through the electrical leads 50 and 51 of sufficient magnitude to reduce the tensile strength of the loop 54 to the point that it breaks from the applied tensile load. On loop breakage, the isolator spool is released and the applied tensile load now pulls the shaft free to move under the tensile load and perform its desired function. Also, the spring temper of wire 42 is such that when the isolator spool end of the wire is released from the loop, the helical diameter of wire 42 enlarges to provide space for the spool halves to move away from each other.

Less electrical current is required to reduce the loop 54 tensile strength to the point that breakage occurs than is required if the loop is fused by the current as in the cited U.S. Pat. No. 3,263,732. Also, fusing takes a relatively longer time than reducing loop tensile strength to the breakage with commensurate amounts of electrical power being applied.

Although other metals may be found advantageous in constructing the leads 50 and 51 and loop 54, in a practical construction of the invention excellent results were obtained with a wire loop constructed of stainless steel. More particularly, stainless steel provides the combination of physical characteristics necessary to practice the invention, namely, non-energized strength sufficient to withstand the tensile preload, and sufficient resistivity to provide the necessary heat to reduce the loop tensile strength with only a modest amount of electrical power.

Although described in connection with a preferred embodiment, it is to be understood that those skilled in the appertaining arts may suggest modifications that come within the spirit of the invention as described and within the ambit of the appended claims.

What is claimed is:

1. A motion initiator, comprising:

a plurality of separable spool means engageable to form an enclosed cavity with an interconnecting bore extending to the exterior of the spool means;

shaftlike means having a first portion held within the spool means cavity and a second portion within the bore when the spool means are engaged, said shaftlike means being subjected to a tensile load tending to move said shaftlike means along the bore to the exterior of the spool means;

a helically wound spring-tempered retaining wire received about the spool means having a relaxed internal turn diameter such as to enable the spool halves to separate and release the shaftlike means and a second lesser tension diameter that causes the radially inwardly facing surface of the spring-tempered wire to contact and retain the spool halves in unitary assembled relation;

a first end portion of the spring-tempered wire being secured within an opening in one of the spool means and the other end portion being received within an insulative hollow spool;

an electrical connector body positioned between adjacent spool means;

a destructible wire carried by the connector having a terminal at each end and an intermediate loop, said loop being received about the insulative spool to tighten the retaining wire helix to the second diameter, said loop having its tensile strength reduced on passage of a predetermined amount of electrical current therethrough sufficiently that the loop is broken from the combination of the tensile load and spring force of the retaining wire.

2. A motion initiator as in claim 1, in which the insulative spool is a ceramic cylinder having a groove on its peripheral surface within which the destructible wire loop is received.

3. A motion initiator as in claim 1, in which there is further provided a post having an end affixed to the outer surface of one of the spool means and extending outwardly between the last turn and the next to the last turn of the retaining wire.

4. A motion initiator as in claim 1, in which the destructible wire is constructed of stainless steel.

5. Apparatus for initiating movement of an object which is preloaded by tensile force along the desired direction of movement, comprising:

a pair of spool means releasably joinable together with facing surfaces defining a cavity for entrapping part of the object therein when said spool means are joined together;

an insulative connector body located between facing surfaces of the spool means;

a high-strength stainless steel wire embedded within the connector body with an intermediate portion extending outwardly of the connector body in a loop;

a length of spring wire encompassing the spool means and connector body, one end portion of the wire being affixed to one of said spool means; and a ceramic spool with a central bore within which the opposite end portion of the spring is securingly received;

the relative dimensions being such that with the loop received about the ceramic spool the spring wire holds the spool means and connector body together sufficiently to prevent the object from being pulled loose from the cavity by the tensile force preload alone;

whereby on passing electric current through the loop of sufficient value the tensile strength of the wire loop is exceeded by the tensile force preload and the loop wire breaks releasing the spring wire which unravels to aid in release of the entrapped object.

6. Apparatus as in claim 5, in which the spring wire end portion extends through the ceramic spool bore and is bent to prevent pulling removal from the ceramic spool.

7. Apparatus as in claim 5, in which the ceramic spool includes a peripheral groove extending generally circularly about said spool.

* * * * *